Jan. 8, 1952     T. P. McCLOSKEY, JR     2,582,051

MOWING MACHINE

Filed July 15, 1949     3 Sheets-Sheet 1

Inventor

Thomas P. McCloskey, Jr.

By Clarence A. O'Brien and Harvey B. Jacobson

Attorneys

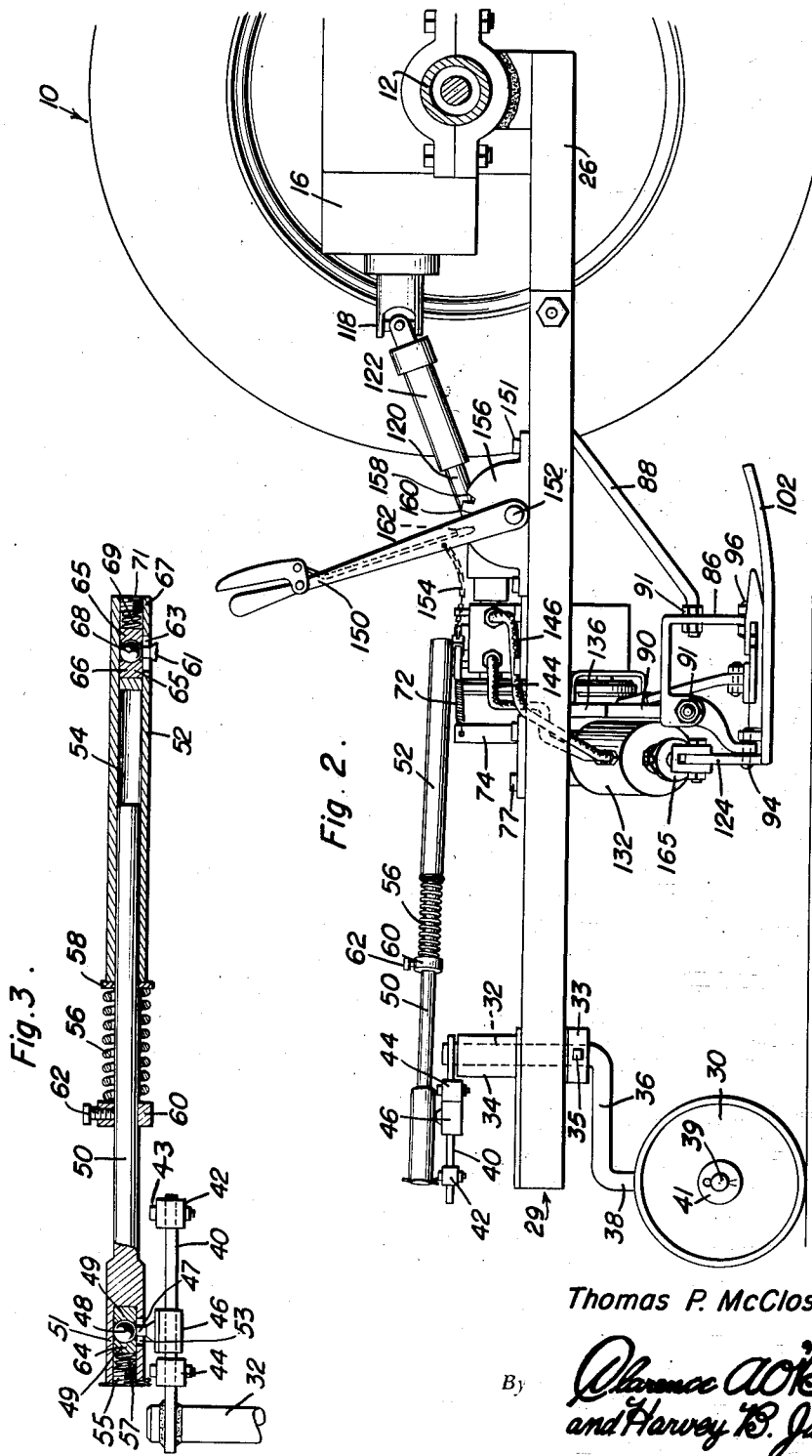

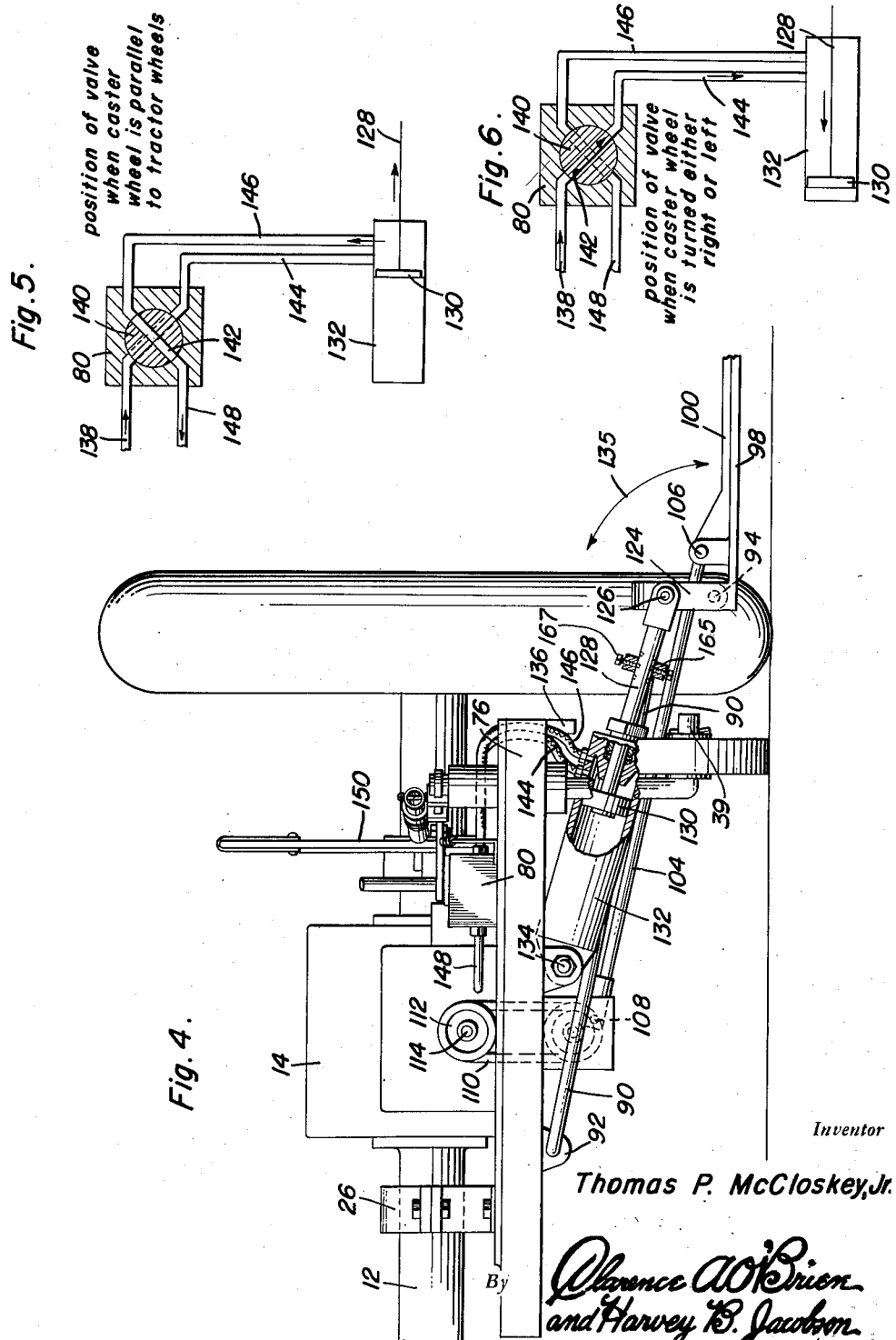

Patented Jan. 8, 1952

2,582,051

UNITED STATES PATENT OFFICE 2,582,051

MOWING MACHINE

Thomas P. McCloskey, Jr., Charleston, Mo.

Application July 15, 1949, Serial No. 104,954

9 Claims. (Cl. 56—25)

1

This invention comprises novel and useful improvements in a mowing machine and more specifically pertains to an implement adapted to be attached to and operated by a conventional form of farm tractor for operating a sickle-type cutter bar, together with means for automatically lifting the bar when the machine makes sharp turns from its path of travel or is moved in a reverse direction.

The principal object of this invention is to provide an improved mowing attachment which may be readily attached to and operated by the power take-off means of farm tractors, whereby the cutter bar may be vertically pivoted to an inoperative position as desired, wherein the pivotal movement is effected by power operated means, and wherein the pivotal movement is automatically effected when the mowing attachment moves in a reverse direction, or when its direction of travel is changed by a predetermined amount.

A very important object of the invention is to provide improved mechanism for actuating the cutter bar of the mowing machine from its horizontal, lowered operative position to a vertical, elevated inoperative position by means of the power take-off mechanism of a tractor.

A further important object of the invention is to provide a mowing machine in accordance with the foregoing objects wherein an improved means is provided for automatically actuating the power operating mechanism, so that the cutter bar will be raised whenever the mowing machine departs from its straight course of travel by a predetermined amount; or is reversed in its movement along the course.

An additional important object of the invention is to provide a mowing machine as set forth in the foregoing objects wherein the automatically operated control mechanism of the power actuating means may be manually operated as desired to selectively raise or lower the cutter bar at the will of the operator.

These, together with various ancillary features and objects of the invention which will later become apparent as the following description proceeds, are attained by this invention, a preferred embodiment of which has been illustrated by way of example only in the accompanying drawings, wherein:

Figure 1 is a top plan view of the mowing machine, shown applied and connected to the rear end of a tractor for operation by the power take-off of the tractor, a portion of the cutter bar being shown in its lowered position;

2

Figure 2 is a vertical sectional view taken substantially upon the section line 2—2 of Figure 1;

Figure 3 is a side elevational view upon an enlarged scale, of the connecting means of Figure 2, parts being broken away and shown in section, and in a different position from that of Figure 2;

Figure 4 is a rear end view of the arrangement of Figures 1 and 2, a part of the fluid pressure actuating cylinder being broken away to show the interior construction thereof, and a portion of the cutter bar shown in its lowered position being omitted;

Figure 1:
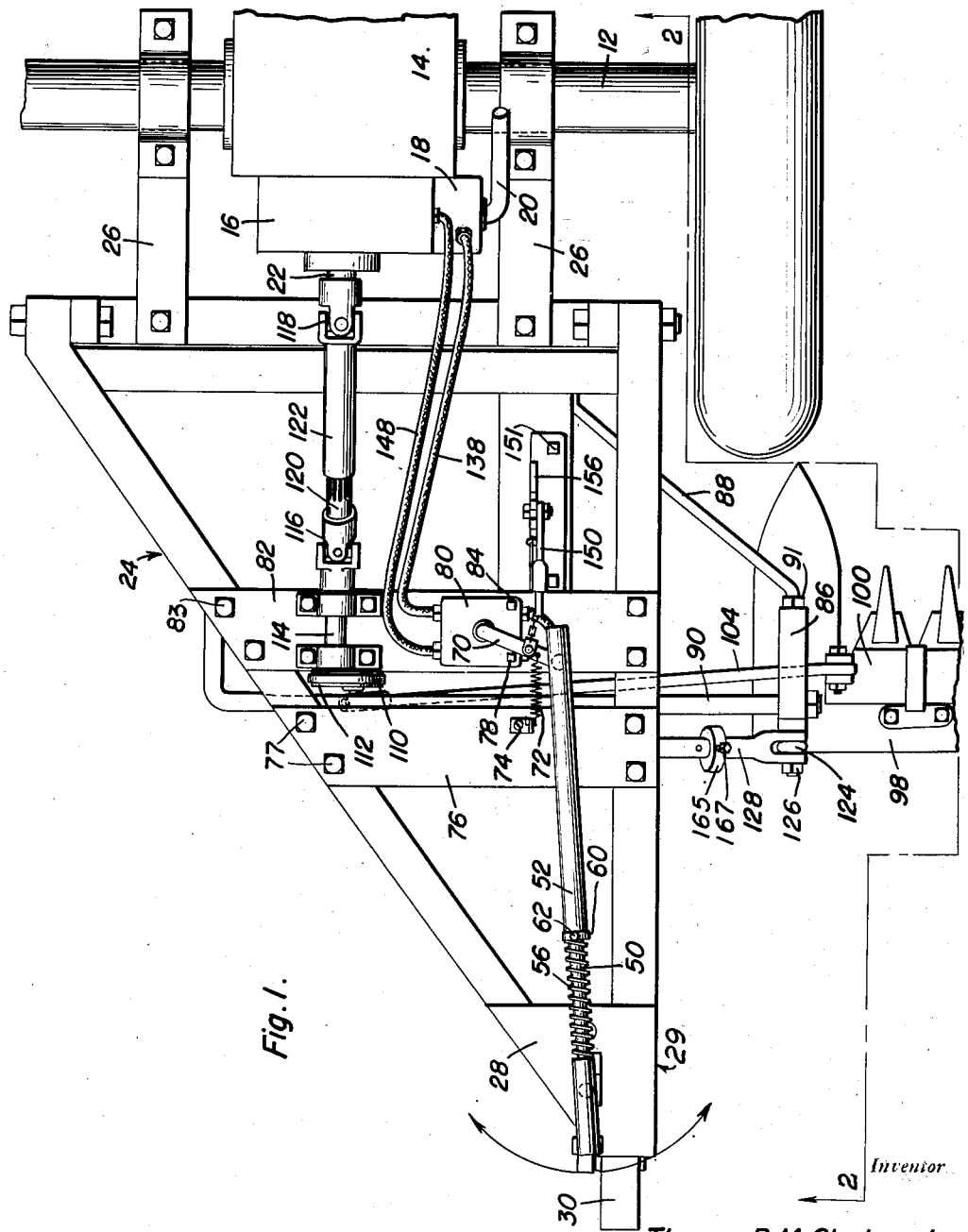

Figure 5 is a diagrammatic view of the control valve showing the same in the position which is the normal position of the parts with the cutter bar lowered and the mowing machine moving along a predetermined path of travel; and Figure 6 is a view similar to Figure 5 but showing the position of the valve when the mowing machine has departed from its predetermined course of travel, and the valve has been moved to a position for causing actuation of the power mechanism for raising the cutter bar.

It should be here noted that the present application is a continuation-in-part of my co-pending application Serial No. 527,269, filed March 20, 1944, which has now matured into Patent No. 2,476,314 of July 19, 1949, wherein a mechanism was disclosed for automatically raising and lowering a cutter bar by mechanical means when the caster wheel of the mowing machine was turned through a predetermined angular extent in a predetermined direction as when the machine was making a sharp turn, or when the direction of travel of the machine was reversed, to thereby raise or lower the cutter bar, the present application including an extension of the principles of the invention set forth in my prior application to a construction wherein movement of the caster wheel in either direction of travel automatically results in an elevation of the cutter bar; and wherein an improved fluid pressure actuating mechanism is provided for raising or lowering the bar in conjunction with an improved automatically actuated control means for the same.

Referring now more specifically to the accompanying drawings, wherein like numerals designate similar parts throughout the various views, the numeral 10 indicates generally a portion of the rear end of a farm tractor of any desired type which is provided with a customary rear axle housing 12, a rear axle differential gear housing 14, a hydraulic power take-off pump casing 16 having a valve casing 18 provided with a manual control valve 20, and a mechanical power take-off shaft 22, all comprising conventional parts of various types of farm tractors.

The present invention is concerned with a mowing machine which is adapted to constitute an attachment which may be releasably coupled to or removed from the conventional farm tractor, this attachment including a triangular-shaped frame indicated generally by the numeral 24, which frame is suitably detachably connected to the axle housing 12 as by any convenient form of clamping means indicated at 26.

This triangular frame tapers to an apex at its rear end 29, and is provided with a gusset plate 28 suitably fixedly secured thereto and which is supported upon a caster wheel 30 by means of which the frame is supported and made mobile.

This caster wheel construction includes a vertically disposed shaft portion or axle 32 rotatably journaled but axially secured in a suitable vertical casing 34 mounted upon the gusset plate 28 of the frame 24, the vertical axle 32 having beneath the frame 24 a collar 33 adjustably secured thereto by a set screw 35. The axle 32 has a horizontally extending arm 36 which terminates in a vertical depending leg 38 upon whose lower laterally outturned extremity 39 the caster wheel 30 is journaled and secured as by a cotter pin 41, while the upper end of the vertical axle or shaft 32 has secured thereto a horizontally extending arm 40 rigidly secured in any convenient known manner to 32 by means of which the power operating mechanism is actuated.

The caster wheel assembly so far described may conveniently be of the same construction set forth in my above identified co-pending application. However, while the arm 40 may be angularly adjusted upon the vertical axle 32 relative to the arm 36, it is preferred to form the same in a parallel relation as illustrated in the drawings.

A pair of fixed stops or abutments 42 and 44 comprising collars with set screws or bolts 43 are slidably and adjustably secured upon the arm 40 so that their position therealong may be adjusted as described, these stops limiting the sliding movement along the arm of a slide member 46 which is thus freely slidable but non-rotatable upon the arm 40 and is provided with an upwardly extending ball or projection 48 constituting part of a ball and socket connection by means of which motion is imparted from the arm 40 in response to movements of the caster wheel 30 for actuating the automatic cutter bar power operating mechanism.

A connecting rod means is provided for transmitting the motion of the arm 40 through the slide 46 and ball 48 thereon to the control means for actuating or controlling the operation of the power operating mechanism. Any conventional swiveling connection can be provided as for example, a ball and socket assembly. This connecting means includes a pair of telescoping rod sections 50 and 52, the section 50 conveniently being formed with a solid end portion which is slidably received within the bore 54 of the section 52, a compression spring 56 being seated against a washer 58 abutting the end of the section 52, this compression spring surrounding the section 50 and abutting an adjustable collar 60 secured as by a set screw 62. It will thus be seen that the spring 56 normally urges the telescoping connecting rod into a relatively extended position, but permits contraction of the rod when a predetermined force has been applied to the ends thereof.

The rod section 50 is provided with a ball and socket bearing assembly indicated generally by the numeral 64 which receives the ball 48 for swivelling movement therein. The ball 48, fixedly secured to the slide 46 as by a stem 47, is engaged between bearing blocks 49, and is slidable with them longitudinally of the socket 51 in the member 50. For this purpose, the stem 47 slides in the slot 53. A closure cap 55 and spring 57 retain the blocks and ball in the socket and yieldingly urge them inwardly thereof. At its other end, the section 52 is provided with a similar ball and socket connection 66 which swively receives a ball 68 extending upwardly from the end of a control valve actuating lever 70. This assembly includes the stem 61 securing the ball 68 to the lever 70, and slides in the slot 63 in member 52. The ball is embraced between the journal or bearing blocks 65 and is slidable therewith in the socket 67, being retained therein and yieldingly urged inwardly thereof by the spring 69 and screw threaded cap or plug 71. This control valve lever 70 is yieldingly urged in one direction as by a tension spring 72 which is terminally attached to the lever 70 and to a stationary lug or support bracket 74 mounted upon a transverse frame member 76 secured as by bolts 77 to the frame 24. Thus, the spring yieldingly urges the valve operating lever 70 into its inoperative position, which movement of the valve lever is limited by a fixed abutment or stop 78 carried conveniently by the control valve casing 80 suitably mounter upon a second transversely extending plate 82 carried by the frame 24 and secured thereto as by bolts 83. The movement of the valve lever 70 to its other extreme, when effected by forward movement of the connecting rod sections 50 and 52 as set forth hereinafter, is limited by a further fixed stop 84 likewise carried by the valve casing 80.

As so far described, the arrangement is such that when the mowing machine is moving forward along a more or less straight path, with the caster wheel 30 being disposed in the position shown in Figure 2 which is the normal running position of the machine, the ball and socket connection of the arm 40 and the connecting rod will permit the connecting rod to be expanded to its fullest extent, and consequently the spring 72 will be permitted to retain the valve control lever 70 in its inoperative position as shown in Figure 1. However, when the mowing machine makes a sharp turn, so that the caster wheel 30 is rotated about its vertical axis 32 in the bearing assembly 34, throughout more than a predetermined minimum arc of travel, the arm 40 will likewise be rotated in a horizontal plane about the axis of the bearing 34 and thereby cause a forward movement of the connecting rod, thus serving to compress the spring 56. The adjustment of the spring 56 will be so proportioned and designed that a predetermined amount of lost motion will be introduced into the system whereby the caster wheel 30 can move to a predetermined minimum arc of travel as when the mowing machine negotiates turns or curves of a relatively great radius, without actuation of the valve by the control valve lever. However, when a sharp turn is made, as at the corner of a field being mowed by the tractor, or when the device is reversed causing the caster wheel to swing through 180 degrees to its opposite position, the compression spring 56 will be sufficiently compressed as to cause the telescoping rod sections 50 and 52 to actuate the control lever 70 from its inoperative position against the stop 78 as shown in Figure 1 to its operative position against the other stop 84.

When the caster wheel straightens out and returns to its original position, under the impetus or resilient action of the compression spring 56, as well as the direction of motion of the mowing machine, the compression of the spring 56 will be relieved whereby the spring 72 can return the valve control lever 70 to its inoperative position shown in Figure 1.

Attention is now directed to the means for supporting and operating the cutter bar of the mowing machine. A supporting frame 86 of any suitable construction is mounted beneath the frame 24 as by and is secured as by bolted fastenings 91 to the supporting and brace members 88 and 90. One end of the member 90 is secured to the frame 86 as shown in Figures 1, 2 and 4, while the other end is pivotally mounted in a depending lug 92, see Figure 4, carried by the frame 24. The arrangement is such that the brace members 88 and 90 may be raised or lowered to thereby cause a vertical swinging movement of the support means 86 in a manner to be set forth hereinafter.

Pivoted to the lower ends of the support means 86 as by hinge pins 94 and 96, is a cutter bar 98 which is of any conventional design and cooperates with a sickle knife 100 which is adapted to reciprocate thereon to constitute a sickle-type of cutter bar of a conventional and known design. The lower surface of the cutter bar 98 may be provided with a foot 102 to constitute a slide for moving over the surface of the ground when the device is used over rough and uneven terrain, to thereby prevent damage of the cutter bar by the striking of obstructions or the like.

The blade 100 of the cutter bar assembly is adapted to be reciprocated longitudinally of the cutter bar 98 by means of a connecting rod 104 which is terminally pivotally connected as at 106 to the blade 100 and at its other extremity is secured to an operating crank 108 which is driven as by a pulley belt 110 from the driving pulley 112, this latter being mounted on a stub shaft 114 journaled in any suitable manner upon the transverse frame member 82 and connected by suitable universal joints 116 and 118, and by telescoping splined shaft elements 120 and 122 to the above mentioned power take-off shaft 22, whereby the cutter bar may be powered by the power take-off of the tractor.

At its rear end, the cutter bar 98 is provided with an integral or a rigidly attached crank arm 124 to which is pivotally connected as at 126 the outer extremity of a piston rod 128 which at its other end carries a piston 130 slidable in a fluid pressure cylinder 132 which is pivotally mounted as at 134 to the undersurface of the transverse frame member 76.

The piston 130 thus slides within the cylinder 132, and when fluid pressure is applied to the cylinder at the right side of the piston 130 as shown in Figure 4, the latter will be urged to its left hand position, whereby through the piston rod 128 and the crank arm 124, the cutter bar assembly will be rotated about its trunnions or fulcrum pins 94 and 96 as indicated by the arrow 135 in Figure 4, to move the same from its lowered or horizontal position to its vertical and inoperative position.

Particular attention is now directed to the manner in which the cutter bar is raised and lowered. Extending beneath the frame 24 is a stationary stop member 136 which is positioned for abutting engagement by the brace 90 as the latter pivots vertically about its fulcrum 92. When the fluid pressure is applied to the cylinder 132 which is in the position shown in Figure 4, the piston 130 is moved to the left thereof, thereby shortening the distance between the pivot pins 134 and 126, thus causing a vertical swinging movement of the cutter bar assembly and its supporting rods 88 and 90, and the cylinder 132 about its pivot pin 134, whereby this entire system is swung or elevated vertically. This upward movement of the system and of the cutter bar assembly continues until such time as the brace 90 strikes the abutment 136. At this time further upward movement of the system consisting of the cylinder 132, the piston rod 128 and the supporting rods 88 and 90 is halted, at which time further movement of the piston 130 into the cylinder 132 begins to pivot the cutter bar 98 about its hinge pins 94 and 96, thereby completing the vertical upward pivoting movement of the cutter bar.

When the fluid pressure operating means is released, the weight of the cutter bar and of the associated linkage is sufficient to cause a reversal of the movement thereby allowing the cutter bar to move to its lower position and the supporting linkage to likewise descend to its lowermost position.

The means for controlling the power operating means will now be described. The control valve casing 80 contains a control valve therein which may be of any desired construction, since the principles of the invention are not limited to any particular type of valve. The operation of this valve will be understood by reference to Figures 5 and 6.

The fluid pressure delivery conduit which may be a flexible hose or other suitable connection, indicated at 138, maintains a constant pressure and constantly supplies pressure fluid to the valve assembly from the valve 18 of the hydraulic power take-off of the tractor, whose construction being of conventional design and including a fluid pressure pump is not illustrated. When the control valve lever 70 is actuated from its idle or inoperative position shown in Figure 1 to its operative position against the fixed stop 84, the control valve member 140 is moved to the position shown in Figure 6, whereby the pressure passage 140 thereof will connect the fluid pressure conduit 138 with a conduit 144 which, in turn, communicates with the cylinder 132 at the right end of the piston 130. The fluid pressure thus supplied by the tractor fluid pressure power take-off is employed to actuate the piston 130 and thereby raise the cutter bar and the cutter bar support as above set forth. When the control valve is moved to its inoperative position, the valve assumes the position shown in Figure 5, whereupon the valve passage 142 in the valve body 140 now connects a fluid return conduit 146 which communicates with the cylinder 132 with a further conduit 148 which discharges into the fluid reservoir in the casing 16 and thence to the inlet side of the fluid pump which constitutes the source of fluid pressure operated by the tractor.

It will thus be seen that fluid moves from the fluid pressure power take-off of the tractor in a single direction, in a step-by-step movement, so that the fluid never reverses its flow through any of the conduits except through the single valve passage 142.

As will be well understood, the fluid pressure of the tractor is rendered operative or inoperative at will by manipulation of the control valve lever 20 of the valve casing 18, but since this valve is of conventional and known design its construction forms no part of this invention and hence has not been illustrated.

In some instances it is also desirable to override the automatic control mechanism of the power operating means for lifting and lowering the cutter bar and for this purpose any suitable means such as a hand lever 150 is pivoted as at 152 to any suitable portion of the frame 24, and is connected as by a chain 154 with the valve control lever 70. The manual control means 150 may be adjusted in any one of three positions, as by means of any convenient form of latch engaging selectively one of three notches formed in a quadrant or sector plate 156 likewise mounted upon the frame of the mower as by bolts 151. In the forward notch, 158, the manual means 150 through its chain 154 urges the lever 70 to its operative position against the stop 84, thus placing the control valve in the position shown in Figure 6, whereby the power operated means is employed to maintain the cutter bar in its raised position. This manual movement of the control valve lever results in a forward movement of the connecting rod section 52, since the section 50 retains its original position which depends entirely upon the position of the wheel 30. This forward movement of the section 52, is permitted since the latter can slide freely upon the rod 50 the spring 56 merely expanding during this operation.

When the latch is engaged in the middle notch 160 of the quadrant, the valve operating lever is prevented from moving past a point half way between the two stops 78 and 84, while when the latch is in the rearmost notch 162, the valve control lever is released for entirely automatic operation.

In the foregoing description, it will be seen that rotation of the caster wheel is relied upon to initiate and direct manipulation of the control valve for operating the fluid pressure operating means. However, it is within the scope of this invention to employ any other desired means which will be responsive to a change of direction exceeding a predetermined minimum extent, from the forward path of travel of the mowing machine to actuate the control valve. Further, other operating means than the fluid pressure system illustrated could be controlled by the means responsive to a change in direction of motion for raising the cutter bar when sharp turns are made or when the tractor and the mowing machine are moved backward.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described. Accordingly, all suitable modifications and equivalents may be resorted to falling within the scope of the appended claims.

It is preferred that a stop or abutment 165 be secured to the rod 128 to vary the length of stroke of the piston 130, thus providing for adjustment of the height of lift of the cutter bar since during turning a corner in a hay field if the time interval consumed in turning is great enough and the length of stroke is not regulated, the cutter bar may be lifted to such heights that it would not have time to fall to the ground in time to cut off the hay it would normally encounter in the course of forward movement after the turn has been completed. When it is desired to mow in deep ditches or leave the field for road travel, an adjustment of the stop 165 will be necessitated. For this purpose, the stop 165 may consist of a collar slidable on the rod 128 and adjustably secured thereon as by the set screw 167.

The piston 130, slidably received in the cylinder 132, is subject to slight modifications so that fluid trapped between the piston 130 and the inner end wall of the cylinder may pass through the piston. The simplest form of such a piston is to utilize a pressure responsive valve, or as commonly referred the piston 130 will be a valved piston. As this type of valved piston is well known in the art it is not illustrated in the drawings.

Any suitable number of check valves (not shown) may be applied to the fluid conduits although a single such check valve, carried by the casing 80, and preventing back flow of fluid through the conduit 146 will be sufficient to permit the intended operation of the hydraulic means.

Obviously, various types of valves could be substituted for the valve 140.

Having described the invention, what is claimed as new is:

1. A mowing machine comprising a frame, a cutter bar mounted for vertical swinging movement on said frame, fluid pressure actuated means mounted on said frame and connected to said cutter bar for automatically raising said cutter bar when the direction of travel of the machine is changed by a predetermined amount.

2. A mowing machine comprising a frame, a caster mounted on said frame and operable on the ground, a cutter bar mounted for swinging movement on the frame, fluid pressure actuated means mounted on said frame and operatively connecting the cutter bar to the caster for raising the cutter bar upon swinging movement of the caster relative to the frame.

3. A mowing machine comprising a frame, a cutter bar mounted for vertical swinging movement on said frame, fluid pressure actuated means connected with said cutter bar for imparting vertical swinging movement thereto and control means operatively connected with said fluid pressure actuated means and responsive to a change in the direction of travel of the machine for operating said fluid pressure actuated means.

4. A mowing machine comprising a frame, a support mounted on said frame for vertical pivotal movement, a cutter bar mounted on said support for vertical swinging movement thereon, fluid pressure actuating means connected with said frame and with said support and operable to successively pivot said support vertically and impart additional vertical swinging movement to said cutter bar.

5. The combination of claim 4, wherein said frame includes a stop for limiting pivotal movement of said support.

6. The combination of claim 4, wherein said frame includes a stop for limiting pivotal movement of said support, said actuating means being connected with said cutter bar and imparting swinging movement thereto upon stoppage of pivoting movement of said support by said stop.

7. A mowing machine comprising a frame, a cutter bar mounted for vertical swinging movement on said frame, fluid pressure actuated means connected with said cutter bar for imparting swinging movement thereto and control means responsive to a change in the direction of travel of the machine for operating said fluid pressure actuated means, said control means including a source of fluid pressure, a valve selectively connecting said source to said fluid pressure actuated means, an element responsive to change in the direction of movement of said frame and means connecting said element to said valve.

8. The combination of claim 7, wherein said last-named means includes an arm connected with said element for oscillation thereby, a slide movable upon said arm and a connecting rod secured to said slide and to said valve.

9. The combination of claim 7, wherein said last named means includes an arm connected with said element for oscillation thereby, a slide movable upon said arm and a connecting rod secured to said slide and to said valve, said connecting rod including longitudinally extensible sections, resilient means biasing said sections to their extended positions.

THOMAS P. McCLOSKEY, Jr.

REFERENCES CITED

The following references are of record in the file of this patent:

UNITED STATES PATENTS

| Number | Name | Date |
| --- | --- | --- |
| Re. 21,819 | Korsmo et al. | June 3, 1941 |
| 1,425,489 | Keagle | Aug. 8, 1922 |
| 1,587,591 | Kocourek | June 8, 1926 |
| 1,616,629 | Jordan | Feb. 8, 1927 |
| 2,291,987 | Rogers | Aug. 4, 1942 |
| 2,476,314 | McCloskey, Jr. | July 19, 1949 |